United States Patent
Babuder et al.

(10) Patent No.: US 6,807,887 B2
(45) Date of Patent: Oct. 26, 2004

(54) MULTIPLE-SPINDLE BAR MACHINE

(75) Inventors: Kirt M. Babuder, Rancho Cucamonga, CA (US); Larry D. Chuba, Douglasville, GA (US); Robert Galosi, Willoughby, OH (US)

(73) Assignee: Tri-Turn Technologies, Inc., Cleveland, OH (US)

( * ) Notice: Subject to any disclaimer, the term of this patent is extended or adjusted under 35 U.S.C. 154(b) by 140 days.

(21) Appl. No.: 10/297,113

(22) PCT Filed: Jun. 8, 2001

(86) PCT No.: PCT/US01/18511

§ 371 (c)(1),
(2), (4) Date: Nov. 27, 2000

(87) PCT Pub. No.: WO01/94060

PCT Pub. Date: Dec. 13, 2001

(65) Prior Publication Data

US 2004/0050221 A1 Mar. 18, 2004

Related U.S. Application Data

(60) Provisional application No. 60/210,245, filed on Jun. 8, 2000.

(51) Int. Cl.[7] ............................................ B23B 9/04
(52) U.S. Cl. ........................... 82/129; 82/120; 82/121; 82/117
(58) Field of Search .................. 82/129, 120, 121, 82/117, 158, 159

(56) References Cited

U.S. PATENT DOCUMENTS

| | | | |
|---|---|---|---|
| 3,180,188 A | * | 4/1965 | Brown .......................... 82/129 |
| 3,693,485 A | * | 9/1972 | Maurer ......................... 82/121 |
| 3,726,162 A | * | 4/1973 | Sato ............................. 82/118 |
| 4,457,193 A | | 7/1984 | Matthey |
| 4,719,676 A | | 1/1988 | Sansone |
| RE33,262 E | | 7/1990 | Link et al. |
| 4,949,444 A | | 8/1990 | Kojima et al. |
| 5,152,201 A | | 10/1992 | Izawa |
| 5,207,134 A | | 5/1993 | Wakatsuki |
| 5,207,135 A | | 5/1993 | Babuder et al. |
| 5,471,900 A | | 12/1995 | Corwin et al. |
| 5,768,962 A | | 6/1998 | Link |
| 5,896,794 A | * | 4/1999 | Trautmann .................... 82/129 |
| 6,484,611 B1 | * | 11/2002 | Grossmann ................... 82/117 |

* cited by examiner

Primary Examiner—Willmon Fridie, Jr.
(74) Attorney, Agent, or Firm—Rankin, Hill, Portner & Clark LLP

(57) ABSTRACT

A multiple spindle bar machine (10) includes in its preferred embodiment three main spindles (66) that are opposed by three counterspindles (106) of substantially identical construction. The main spindles (66) can be indexed about the Z axis. The counterspindles (106) cannot be indexed, but they can translate along the Z-axis. Each main spindle (66) is hollow and contains a workpiece-grasping collet chuck (68). At least one of the counterspindles (106) contains a workpiece-grasping collet chuck (108). The main spindles (66) are rotated in unison, but the counterspindles (106) are rotated independently by computer-controlled motors. In the preferred embodiment, three tool-carrying turrets (20A, 20B, 20C) are radially spaced around the machine at three work stations. Preferably, the turrets (20A, 20B) located at the first and second workstations can be moved along both the X and Z axes, while the turret (20C) located at the third workstation can be moved along the X axis. A slide-mounted cutoff (22) that moves along the X axisis located at the third workstation.

19 Claims, 6 Drawing Sheets

MULTIPLE-SPINDLE BAR MACHINE

REFERENCE TO PROVISIONAL APPLICATION

The present application claims priority from, and incorporates by reference, U.S. application Ser. No. 60/210,245, filed Jun. 8, 2000 by Kirt M. Babuder, et al.

BACKGROUND OF THE INVENTION

1. Field of the Invention

The invention relates to multiple spindle bar machines and, more particularly, to a multiple spindle bar machine especially suitable for manufacturing small lot sizes. The machine permits quick tool changeovers, has short cycle times, and can be operated substantially automatically.

2. Description of the Prior Art

Conventional bar machines are mechanically based, that is, they rely on complex gear trains to control the operation of spindles and other parts. Such machines are expensive to manufacture, require highly skilled personnel to operate, have long setup times, and run at relatively slow operating speeds. These machines are suitable for long manufacturing runs. It is difficult to manufacture complex parts because only a few machining operations can be performed on a given machine. In many cases the parts must be removed from one machine and installed on another machine in order to complete all machining operations.

In recent years, the versatility of bar machines has been enhanced by the introduction of computer numeric control (CNC). Also, synchronous motors have been used to drive spindles and spindle slides, thereby increasing the capabilities of the machines. Many of the machines in question advance bar stock along a single axis (the Z axis). Typically, these machines advance the stock through a main spindle toward a counterspindle that is coaxial with the main spindle. Machining operations are performed on the front of the stock by turret-mounted tools in a work station located between the opposing main spindle and counterspindle. After the workpiece has been grasped by the counterspindle while the counterspindle is rotating at the same speed as the main spindle, the workpiece is severed from the remainder of the stock and withdrawn by the counterspindle. Additional machining operations then can be performed on the back of the workpiece. Examples of such single axis machines are U.S. Pat. No. 4,457,193 to Matthey, U.S. Pat. No. 4,719,676 to Sansone, U.S. Pat. No. 4,949,444 to Kojima et al;, U.S. Pat. No. 5,152,201 to Izawa, and U.S. Pat. No. 5,471,900 to Corwin et al.

Enhanced variations of these machines are known. For example, the Izawa patent also discloses a multi-axis machine in which a workpiece is advanced along the Z axis, but it also can be moved along the X axis (horizontally of the machine). This result is accomplished by mounting the counterspindle on slides that can move along both the X axis and the Z axis. As used herein, the term "Z axis" refers to any axis the same as or parallel to an axis about which workpieces are rotated, including the longitudinal centerline of the machine. The term "X axis" refers to any axis that extends radially from the Z axis and which is perpendicular to the Z axis.

U.S. Pat. No. 5,207,134 to Wakatsuki discloses a single-axis machine in which two counterspindles are disposed side-by-side. The counterspindles can be moved along both the X axis and the Z axis. This construction enables each counterspindle to grasp the workpiece at different stages in the machining process.

U.S. Re. Pat. No. 33,252 to Link et al. discloses a machine in which a turret-mounted counterspindle is movable along the X and Z axes. The turret itself is rotatable about the X axis. A third tool carrier is disposed away from the main spindle and offset from the Z axis. With this machine, a workpiece grasped by the counterspindle can be pivoted away from the main spindle and moved laterally to the third tool carrier for performing machining operations on the back of the workpiece.

U.S. Pat. No. 5,207,135 to K. Babuder et al. discloses a machine having drum-mounted multiple main spindles. A single counterspindle is aligned with a selected one of the main spindles. Upon indexing the drum, the main spindles will be moved from station to station about the Z axis. Workpieces held by the main spindles thus can be indexed about the Z axis to sequential workstations where machining operations can be performed on the front of the workpieces by turret-mounted tools that slide along the X axis. After various machining operations have been performed on a given workpiece, the workpiece can be grasped by the counterspindle, severed from the stock, and withdrawn along the Z axis so that machining operations can be performed on the back of the workpiece by slide-mounted tools that move along the X axis.

Despite the advances of recent machines such as those referenced, there remains a need for a bar machine that can manufacture small lot sizes, has a quick tool changeover time, has very short cycle times, and which can be operated substantially automatically.

SUMMARY OF THE INVENTION

In response to the foregoing concerns, the present invention provides a new and improved multiple spindle bar machine. In the preferred embodiment, the machine according to the invention features three main spindles that are opposed by three counterspindles of substantially identical construction. The region between an opposed main spindle and a counterspindle is referred to as a workstation. The main spindles can be indexed about the Z axis. The counterspindles cannot be indexed, but they can move back and forth along the Z axis. A workpiece-grasping collet chuck is mounted to the end of each main spindle, and preferably to each counterspindle as well. The main spindles are rotated in unison while the counterspindles are rotated independently. All of the spindles are driven by computer-controlled motors.

In the preferred embodiment, three tool-carrying turrets that index about the Z axis are radially spaced around the machine at the workstations. Preferably, the turrets located at the first and second workstations can be moved along both the X and Z axes, while the turret located at the third workstation can be moved along the X axis. A slide-mounted cutoff that moves along the X axis is located at the third workstation. The invention includes a clamp for maintaining the main spindles in a desired indexed position and a tri-lobal toolslide that supports the counterspindles for movement.

The foregoing construction makes the machine exceedingly versatile. For example, one or more of the counterspindles can be fitted with drill bits or counterbores. Because the main spindles and the counterspindles are independently controlled, the effective rotational speed of a bit or counterbore can be doubled if the main spindle and the counterspindle are rotated in opposite directions. Typically, drilling and turning operations will be performed at the first workstation. End face machining and counterboring will be performed at the second workstation. At the third workstation, the workpiece will be severed from the stock by the cutoff after the spindles have been synchronized and the front of the workpiece has been grasped by the counterspindle. Thereafter, additional machining operations such as center drilling and thread rolling can be performed on the back of the workpiece by tools carried by the third turret.

Because the spindles are hollow, long workpieces can be accommodated by the counterspindles. If desired, workpieces can be passed from the main spindles to the corresponding counterspindles and back again to the main spindles. This feature is useful where it is desirable to perform machining operations on the back of a workpiece before performing operations on the front of the workpiece. The particular toolslide used with the invention provides good support for the counterspindles while permitting them to be positioned closely together.

The foregoing and other features and advantages of the invention will be apparent to those skilled in the art after a review of the accompanying specification, claims, and drawings.

DESCRIPTION OF THE PREFERRED EMBODIMENT

Figure 1:
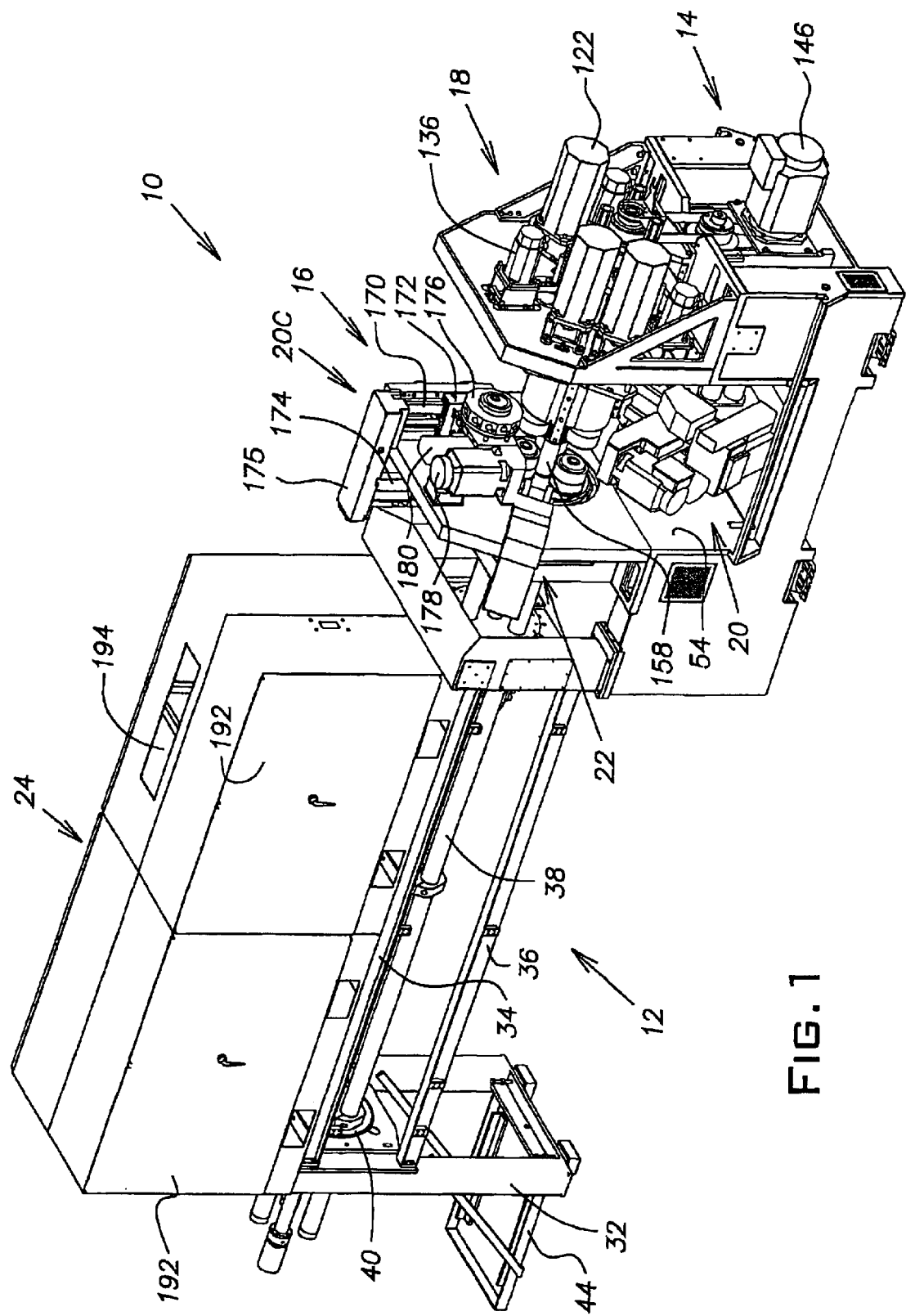
FIG. 1 is a perspective view of a multiple spindle bar machine according to the invention.

Referring to the Figures, a multiple spindle bar machine is indicated by the reference numeral 10. The machine 10 includes several major components and assemblies, as follows: a stock feeder 12, a base 14, a main spindle assembly 16, a counter spindle assembly 18, turret assemblies 20, a slide-mounted cutoff 22, and a control box 24 within which computer control equipment is disposed. Although the foregoing components and assemblies will be described in considerable detail, certain parts are well known to those skilled in the art and will not be illustrated or described herein. The parts in question parts include various protective covers and shields, lights disposed about the workstations, coolant lines and associated pumps and controls, conveyors or chutes to remove finished parts from the machine 10, and techniques to discharge coolant and metal chips from the machine 10, such as a downwardly extending chute or a chip removal conveyor and a coolant tank.

The Stock Feeder 12

The stock feeder 14 is attached to front and rear frame members 30, 32. The frame members 30, 32 are connected by upper and lower beams 34, 36. Three elongate feed tubes 38 are supported for rotation about a central axis by circular bearing members 40 that are attached to the frame members 30, 32. Bar stock is inserted into the feed tubes 38 by retracting hinged entry tubes 42. The tubes 38 are flooded with hydraulic oil from a tank (not shown) supported by a stand 44. A piston disposed in each entry tube 42 advances the stock, or workpiece, through the tube 38.

A more complete description of the construction and operation of a stock feeder similar to the stock feeder 14 can be found in U.S. Pat. No. 5,586,477, issued Dec. 24, 1996 to K. Babuder, et al., the disclosure of which is incorporated herein by reference. Single-tube stock feeders also are commercially available from Lexair, Inc., Lexington, Ky., under the trademark RHINOBAR. If it is not desired to use the stock feeder 14, the machine can be operated as a chucker The Base 14

The base 14 is a generally rectangular structure having pads 46, 48 to which the main spindle and counterspindle assemblies 16, 18 are mounted, respectively. The base 14 includes a pair of spaced legs 50 that extend longitudinally from the pad 46. The frame member 30 is mounted to pads 51 disposed atop the legs 50. A well 52 is disposed between the pads 46, 48 and is defined by end walls 54, 56 and sloping side walls 58. A center wall 60 divides the well 52 into two chambers. The side walls 58 direct metal chips and coolant downwardly to a drain. The center wall 60 provides support for a portion of the counterspindle assembly 18 as well as the lower two turret assemblies 20. In order for the base 14 to have adequate strength, it is made largely of steel plates and beams that are bolted or welded together.

The Main Spindle Assembly 16

The main spindle assembly 16 is connected to, and supported by, a headstock 62. The headstock 62 is disposed atop by the mounting pad 46. The assembly 16 includes a drum-like carrier 64 that includes three longitudinally extending main spindles 66 that are disposed equidistantly about the centerline of the carrier 64. The spindles 66 each are supported in the carrier 64 for rotation about the Z axis by ceramic ball bearings (not shown). Each of the spindles 66 has a front seal (not shown) with an air purge isolator that provides positive pressure to keep debris out of the seal and bearing. A pneumatically operated collet chuck 68 is connected to the front of each of the spindles 66. A beveled spindle gear 70 is circumferentially disposed about each of the spindles 66. A beveled spindle drive gear 72 is disposed at the center of the carrier 64. The technique by which the drive gear 72 is rotated will be described subsequently. The drive gear 72 engages each of the spindle gears 70. As will be apparent from an examination of FIG. 3, rotation of the drive gear 72 in one direction will cause all of the spindles 66 to be rotated simultaneously in the opposite direction at the same speed. A ring gear 74 is disposed circumferentially about the periphery of the carrier 64.

In the preferred embodiment, the spindles 66 have a through bore of 40 mm. The spindles 66 can be provided optionally with a spindle positioner (not shown) that will stop rotation of the spindles 66 at a desired radial location in order to facilitate cross-drilling of a workpiece. The collet chucks 68 are biased to a normally closed position by internal springs and are opened against the spring bias by air pressure. The spindles 66 are commercially available from Setco, Cincinnati, Ohio. The collets 68 are commercially available from Production Dynamics, Valparaiso, Ind.

Figure 6:
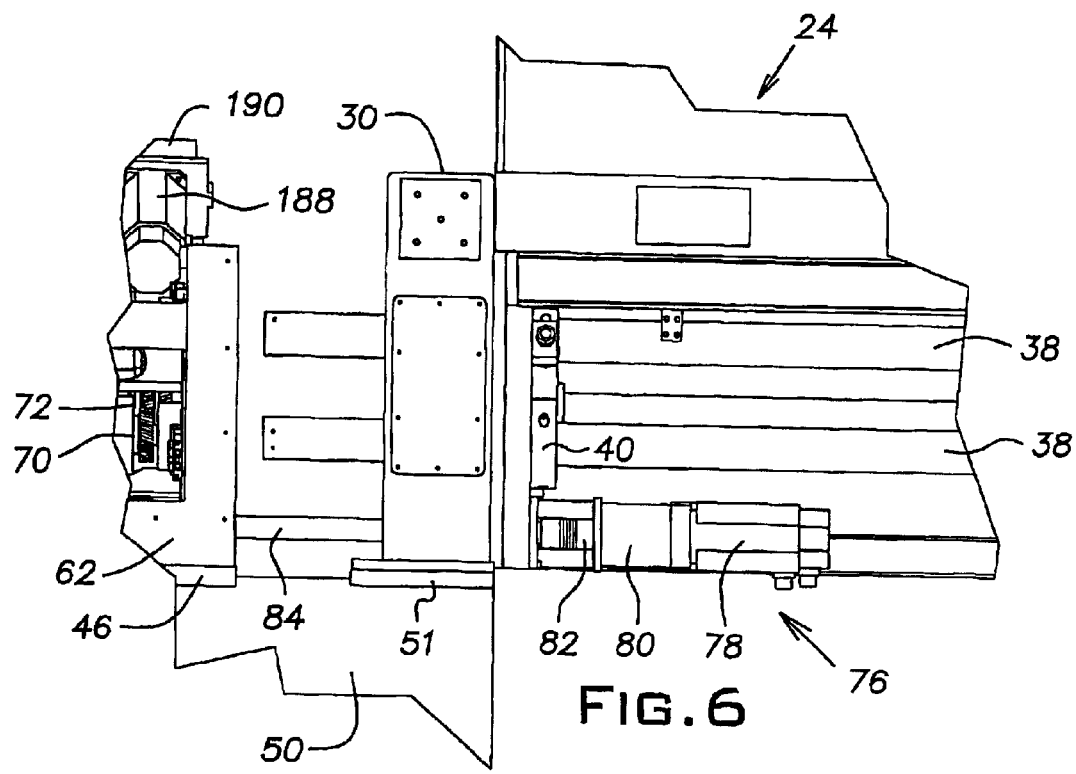
FIG. 6 is a side elevation view of a portion of the bar stock feeder and an indexing mechanism for the main spindles.

A carrier index drive assembly 76 (FIG. 6) is connected to one of the upper beams 34. The drive assembly 76 includes a motor 78, a gearbox 80, a coupling 82, a drive shaft 84, and two spur gears 86. One of the spur gears 86 engages the ring gear 74 (see FIG. 3). The other spur gear 86 engages a gear included as part of the forward circular bearing member 40. The spur gears 86 are of the same diameter, as are the ring gear 74 and the gear included as part of the forward circular bearing member 40.

Hence, rotation of the drive shaft 84 will cause the feed tubes 38 and the spindles 66 to be indexed in unison.

Figure 7:
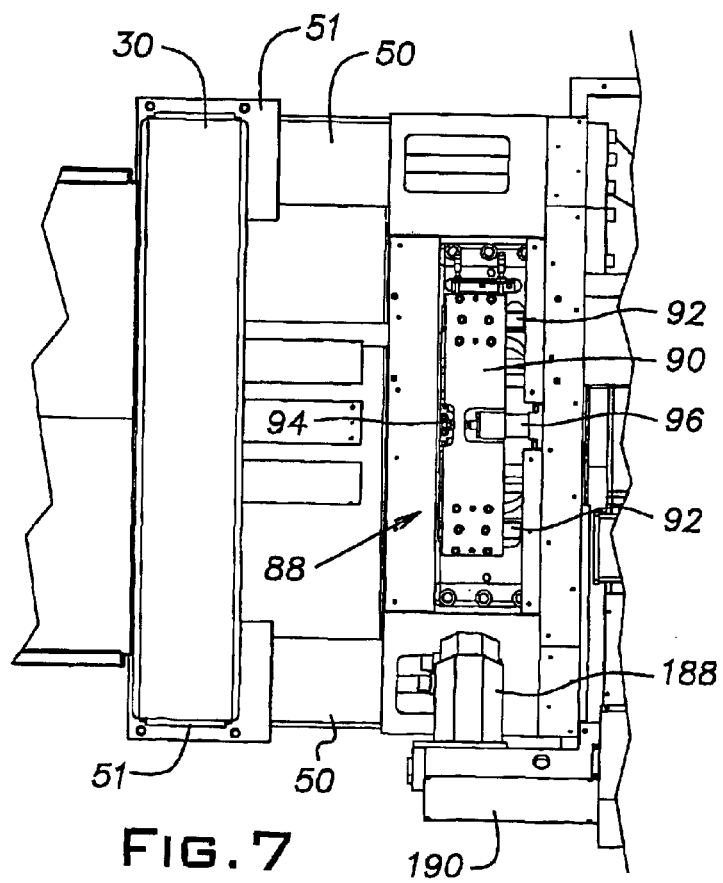
FIG. 7 is a top plan view of a portion of the machine according to the invention showing a carriage damp.

Referring particularly to FIG. 7, a carrier clamp 88 is disposed atop the headstock 62. The clamp 88 includes a slide 90 mounted to guide rails 92 for fore and aft movement along the Z axis. A locating block 94 is carried by the slide 90. A hydraulic cylinder 96 is connected between the headstock 62 and the slide 90. Three circumferentially spaced pairs of teeth (not shown) are carried by the carrier 64. After the carrier 64 has been indexed to a desired position by the drive assembly 76, the cylinder 96 can be actuated to cause the locating block 94 to engage the teeth carried by the carrier 64, and thereby positively lock the carrier 64 in its then-current position. Upon retraction of the block 94, the block 94 and the teeth will be disengaged so as to permit the carrier 64 to be indexed to another position.

In order to provide precise control of the indexing operation, the motor 78 is a D.C. brushless servo motor. The motor 78 is commercially available from G. E. Fanuc, Cleveland, Ohio. In the preferred embodiment, the diameter of a circle passing through the centerlines of the spindles 66 is 270 mm. The diameter of the carrier 64 is 433 mm at the bearing inner diameter. The Index time of the carrier 64 is 1.4 seconds.

The Counterspindle Assembly 18

The counterspindle assembly 18 is connected to, and supported by, a back wall 100. The back wall 100 is supported by triangular gussets 102. The back wall 100 and the gussets 102 are disposed atop the mounting pad 48. The assembly 18 includes a toolslide 104 that supports three longitudinally extending counterspindles 106. The counterspindles 106 are identical to the main spindles 66. A pneumatically operated collet chuck 108 is connected to the front of the uppermost counterspindle 106 and, preferably, the two lower spindles 106, as well. Optionally, collets 108 for one or both of the two lower spindles 106 can be eliminated. If collets 108 are not provided for one or both of the lower counterspindles 106, the counterspindles 106 can be fitted with various types of tooling (such as drill bits). The collets 108 are identical to the collets 68. Each counterspindle 106 and its associated collet 108 are supported for rotation by a housing 110. A drive flange 112 extends radially from the housing 110.

The toolslide 104 has three equally spaced, longitudinally extending lobes 114. The toolslide 104 is bolted to the back wall 100. A longitudinally extending through bore is formed at the center of the toolslide 104. The through bore is aligned with a corresponding opening in the back wall 100. Each lobe 114 carries a pair of opposed dovetail-shaped rails 116 upon which carriage blocks 118 are mounted for movement along the Z axis. The housings 110 are connected to the carriage blocks 118. When the housings 110 are connected to the carriage blocks 118 (see FIG. 4), the counterspindles 106 are positioned in a triangular arrangement where each counterspindle 106 is directly opposed to, and aligned with, one of the main spindles 66. The lobes 114 are positioned such that the lowermost one is vertical where it can be supported on the top of the center wall 60 by a spacer 120.

Figure 5:
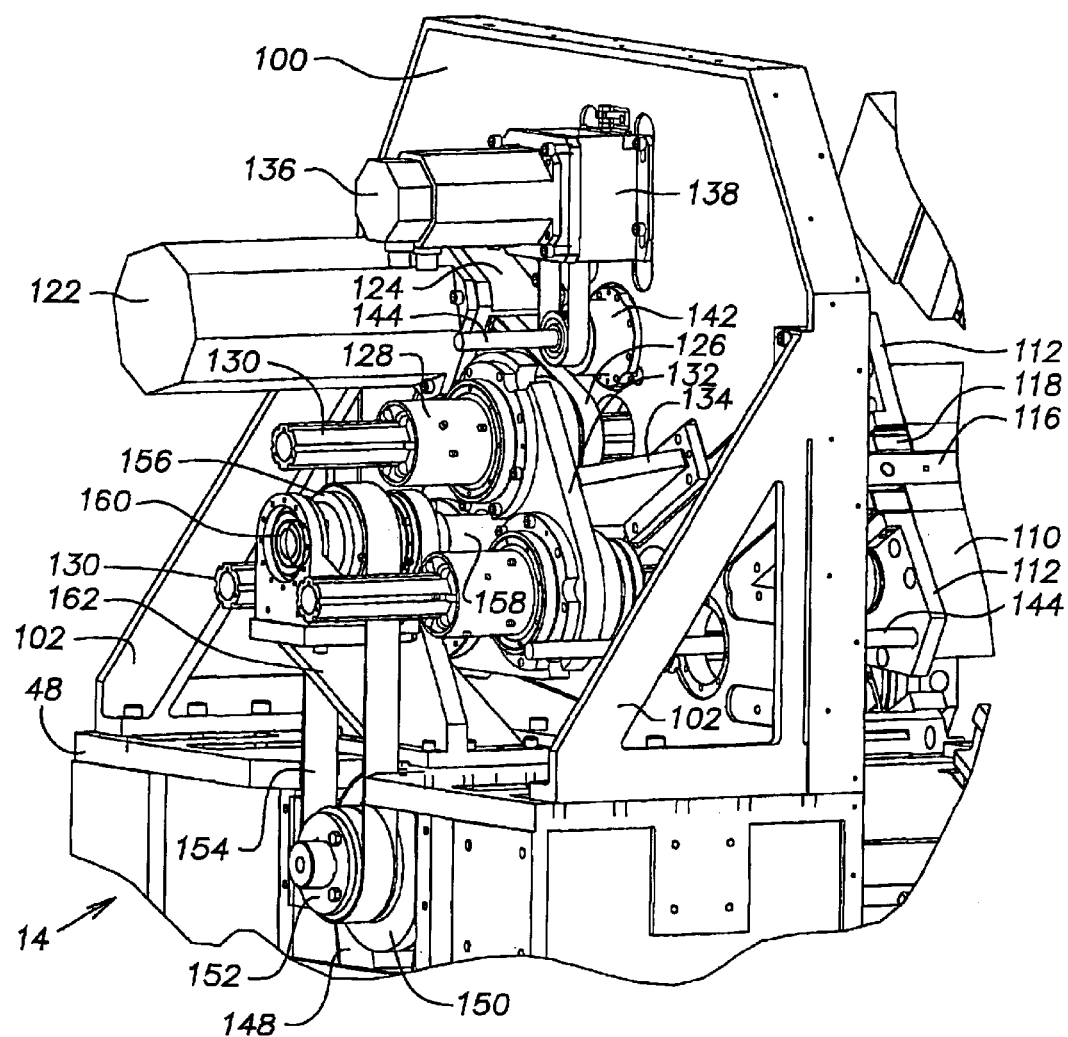
FIG. 5 is an enlarged perspective view of the rear of the machine according to the invention showing various drive mechanisms for the main spindles and counterspindles, with certain motors omitted for clarity of illustration.

Referring particularly to FIGS. 1 and 5, a motor 122 is provided for each counterspindle 106 in order to rotate each spindle 106 independently of the others. A mounting bracket 124 connects the motor 122 to the back wall 100. A drive belt 126 is powered by the motor 122 to drive a pulley included as part of a splined ball drive 128. A hollow splined shaft 130 extends through the drive 128. The drive 128 permits the shaft 130 to rotate while being moved longitudinally. Because the shaft 130 is hollow, it can accommodate workpieces being moved through the machine 10, thereby permitting long workpieces to be machined. The drive 128 is mounted in a triangular back support 132 that is connected to the back wall 100 by brackets 134.

The motor 122 is bidirectional and generates 5.5 kW (7.4 horsepower) at 8000 RPM. The maximum permissible speed when driving the spindles 106 is 5000 RPM. The motor 122 is commercially available from G. E. Fanuc, Cleveland, Ohio. By appropriate control of the motors 122, the rotational speed of the counterspindles 106 can be synchronized to the rotational speed of the main spindles 66.

A servo motor 136 is provided for each counterspindle 106 in order to reciprocate each spindle 106 along the Z axis independently of the others. A mounting bracket 138 connects the motor 136 to the back wall 100. A drive belt 140 is powered by the motor 136 to drive a pulley included as part of a ball screw actuator 142 from which a ball screw 144 extends. The ball screw actuator 142 is connected to the back wall 100 by suitable fasteners. The forward end of the ball screw 144 is connected to the drive flange 112. The ball screw actuator 142 causes the ball screw 144 to be moved longitudinally without being rotated.

The servo motor 136 generates 6 N-m (50 inch-pounds) torque at 3000 RPM. The maximum speed that the counterspindles 106 can be advanced or retracted using the motor 136 is 15 meters per minute. The axial slide resolution of the ball screw actuator 142 (the smallest distance the counterspindles 106 can be advanced or retracted) is 0.0025 mm. The motor 136 is commercially available from G. E. Fanuc, Cleveland, Ohio. The ball screw actuator 142 is commercially available from Star Linear Systems, Charlotte, N.C.

The drive mechanism for the main spindles 66 will be described now. As shown in FIG. 1, a single drive motor 146 is provided to rotate the main spindles 66. The motor 146 is mounted to the base 14. Referring particularly to FIG. 5, the motor 146 has a pulley that drives a belt 148, which in turn drives a pulley 150. The pulley 150 is twice the diameter of the motor pulley. The pulley 150 drives a smaller pulley 152 that in turn drives a belt 154. A pulley 156 is connected to a drive shaft 158. The pulleys 152, 156 are the same diameter. The drive shaft 158 extends through the previously described opening in the back wall 100 and the through opening in the toolslide 104. The drive shaft 158 extends through the well 52 and is connected to the drive gear 72. A bearing 160 supports the end of the shaft 158 for rotation. A bracket 162 is connected to the mounting pad 48 to support the bearing 160.

The drive motor 146 is a 20.1 horsepower, continuous, variable speed motor commercially available from G. E. Fanuc, Cleveland, Ohio. The motor 146 is capable of rotating the main spindles 66 at a speed of 5000 RPM (6000 RPM if the machine 10 is operated as a chucker).

The Turret Assemblies 20

The two lower turret assemblies are positioned at the first and second (lower) workstations and are identified by the reference numerals 20A, 20B, respectively, while the third turret assembly is positioned at the third (upper) workstation and is identified by the reference numeral 20C. The turret assemblies 20A, 20B are capable of moving along both the X and Z axes, while the turret assembly 20C is capable of moving only along the X axis.

Figure 2:
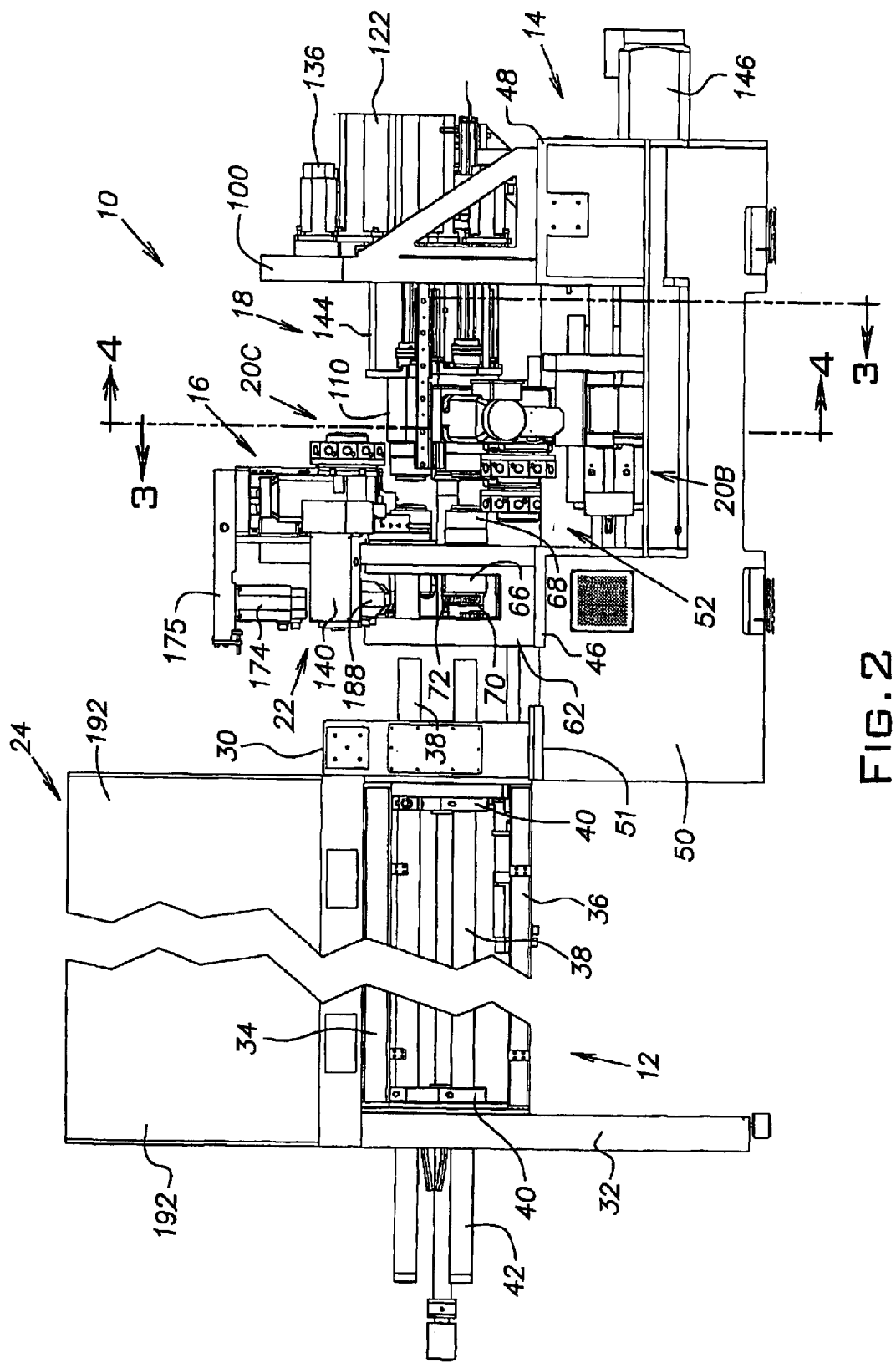
FIG. 2 is a side elevation view of the machine according to the invention with portions of a bar stock feeder and a control box broken away and removed.
Figure 3:
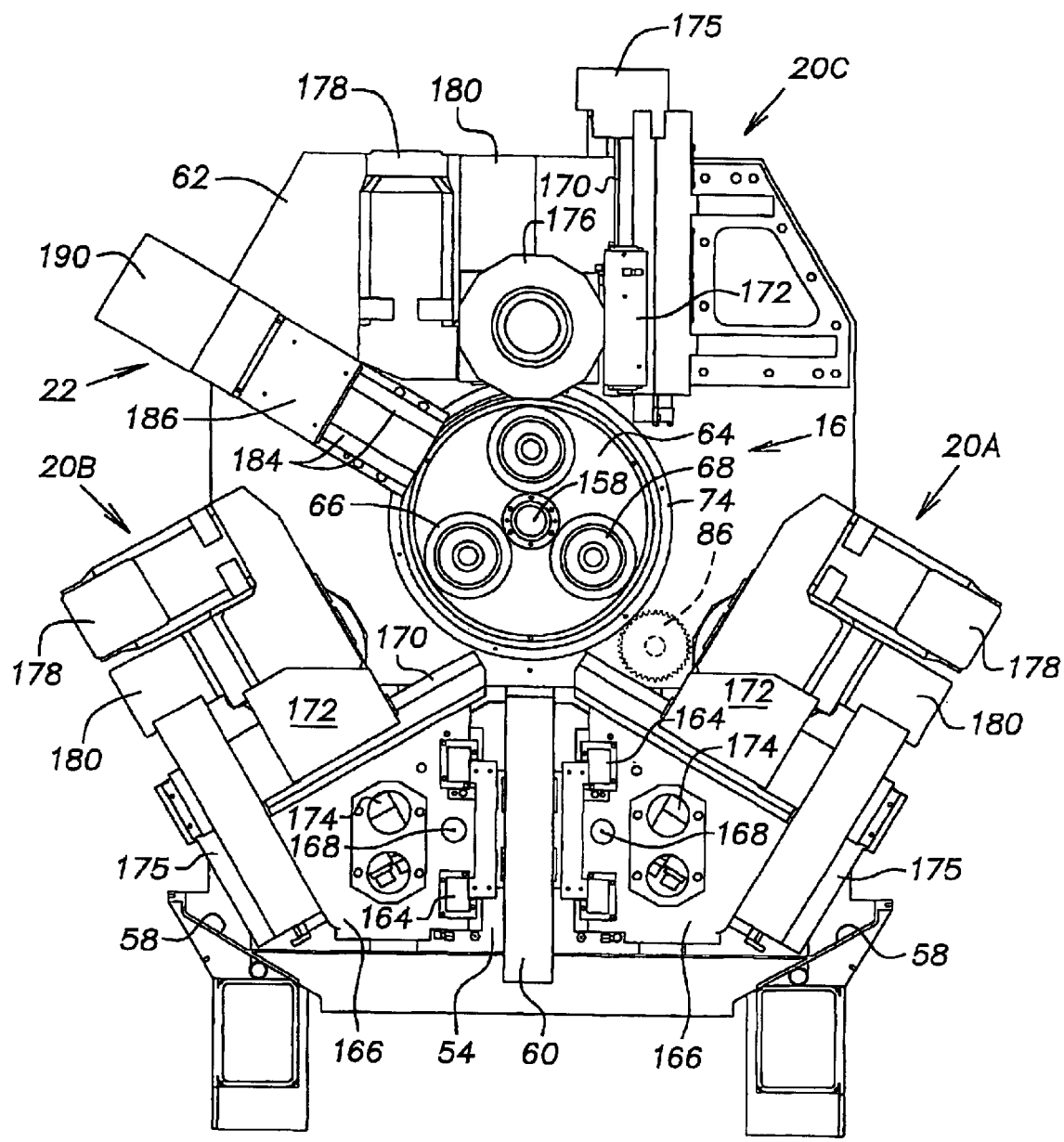
FIG. 3 is an end view of main spindles used with the invention taken along a plane indicated by line 3—3 in FIG. 2.
Figure 4:
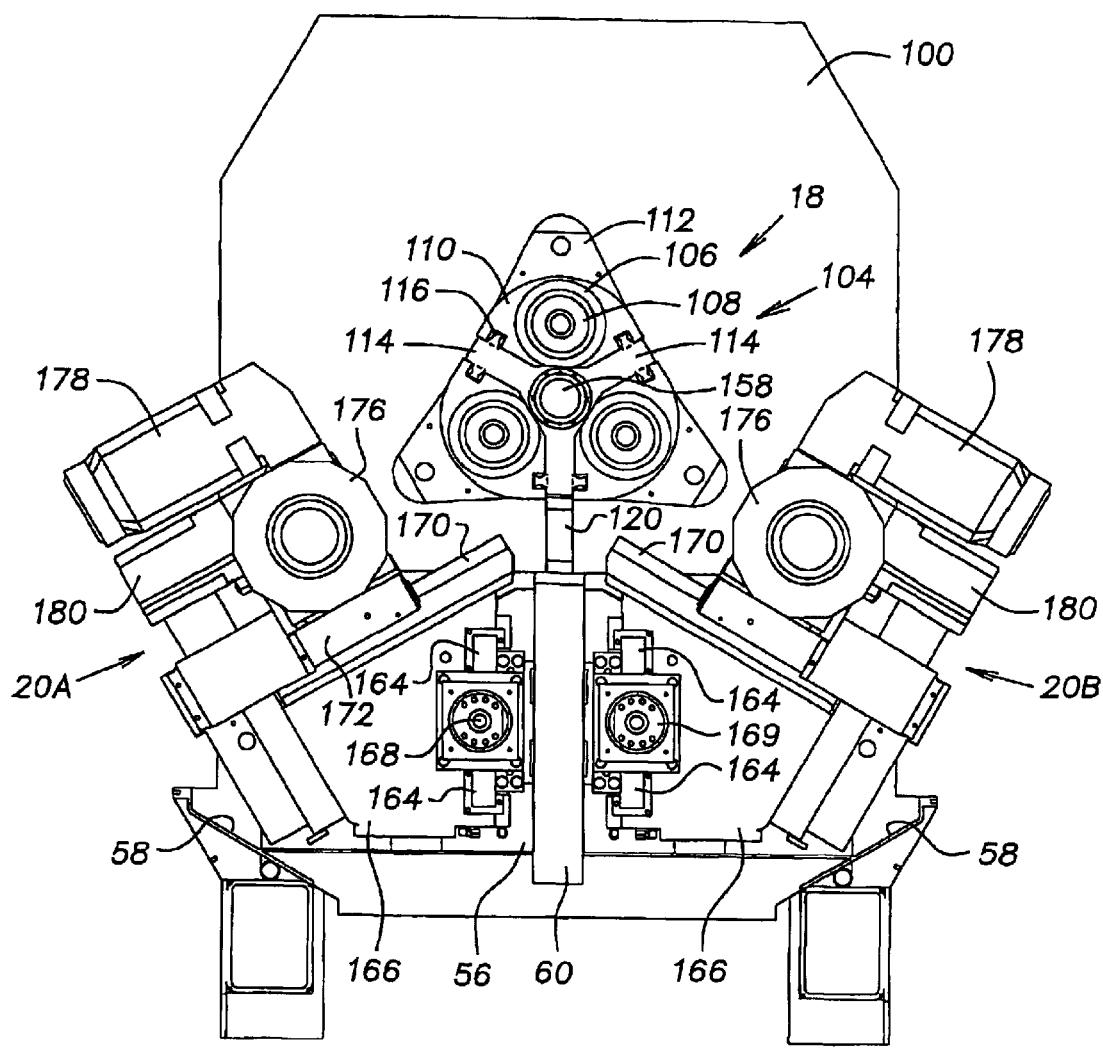
FIG. 4 is an end view of counterspindles used with the invention taken along a plane indicated by line 4—4 in FIG. 2.

Referring particularly to FIGS. 2, 3, and 4, and with reference to each of the turrets assemblies 20A, 20B, Z axis ways 164 are connected to the center wall 60. A Z axis slide 166 is mounted for back and forth movement on the ways 164. A ball screw 188 extends longitudinally of the machine 10 and is connected at one end to a servo motor (concealed behind the headstock 62). The other end of the ball screw 168 is operatively connected to a ball nut disposed within a housing 169 attached to the slide 166. A pair of inclined X axis ways 170 are disposed atop the slide 166. An X axis slide 172 is mounted atop the ways 170 for back and forth movement along the X axis. A servo motor 174 (partially shown in FIG. 3) drives a ball screw actuator (concealed by shields) to effect movement of the X axis slide 172. A bracket 175 supports the X axis servo motor 174.

A 12-sided turret 176 is mounted to the X axis slide 172 and is disposed perpendicular to the Z axis. A servo motor 178 provides power for live tools such as drill bits carried by the turret 176. A motor 180 is connected to the turret 176 to index the turret 176 about the Z axis to present different tools to a workpiece.

In a manner similar to the turret assemblies 20A, 20B, the turret assembly 20C includes a pair of X axis ways 170, an X axis slide 172, a servo motor 174 to drive a ball screw actuator, a servo motor support bracket 175, a turret 176 (which may be four-sided, if desired), a servo motor 178 to provide power for live tools, and an indexing motor 180 to index the turret 176 about the Z axis.

The Slide-Mounted Cutoff 22

The slidemounted cutoff 22 is disposed at the third (upper) workstation and includes ways 184 that are connected to the headstock 62. The ways 184 that are aligned with the X axis. A slide 186 is mounted to the ways 184 for movement back and forth along the X axis. A cutoff blade (not shown) projects from the forward end of the slide 186. The slide 186 is driven by a ball screw actuator that is powered by a servo motor 188. The servo motor 188 is supported by a bracket 190.

The ball screw actuators and the servo motors used with the turret assemblies 20 and the cutoff 22 are substantially similar to the ball screw actuators 142 and the servo motors 136 used to reciprocate the counterspindles 106.

The Control Box 24

The control box 24 is mounted atop the upper beams 34 and spans the length of the beams 34 from the front frame member 30 to the rear frame member 32. The box 24 has a pair of access doors 192 and openings 194 for cooling fans, as is conventional. The box 24 contains the computer software and controls necessary to operate the machine 10.

As is conventional, the control equipment includes a computer numeric control (CNC) that is PC-based. The CNC is programmed by the user to provide instructions to the various motors, actuators, and so forth needed to make a part of a particular configuration. The CNC is commercially available from G. E. Fanuc, Cleveland, Ohio, Model No. 1601.

The CNC is connected to a programmable machine controller (PMC) that provides low voltage output (24 volts D.C.) to various valves add lights. The PMC also provides high voltage output (480 volts) to the servo drives and spindle drives. The PMC receives various inputs from switches and sensors attached to moving components of the machine 10 in order to provide feedback to the PMC concerning the status of programmed operations. The PMC is commercially available from G. E. Fanuc, Cleveland, Ohio, Model No. SB-6. The PMC is programmed at the factory based on the specific equipment included as part of the machine 10.

Reference is made to U.S. Pat. No. 5,207,135, issued May 4, 1993 to K. Babuder, et al., the disclosure of which is incorporated by reference, for a disclosure of a multiple spindle bar machine similar to that disclosed herein, together with a description of how the machine can be operated.

Operation

In a typical manner of operation, the carrier clamp 88 is actuated to lock the carrier 64 in place. Bar stock is fed through the feed tube 38 and the main spindle 66 located at the first workstation. Feeding occurs until the turret 176 is contacted by the workpiece and the turret assembly 20A is pushed away from the main spindle 66 a desired distance. Then, the collet chuck 26 is clamped to lock the workpiece in place. The turret 176 is indexed to present a desired tool to the workpiece and machining operations are commenced by rotating the spindles 66 and moving the turret 176 as required.

After work at the first workstation has been completed, the carrier clamp 88 is unlocked, and the feed tubes 38 and the spindles 66 are indexed so that the partially machined workpiece is moved to the second workstation. The previously described procedure is carried out for a new workpiece at the first workstation. Simultaneously, machining operations are performed on the first workpiece at the second workstation by tools carried by the turret assembly 20B. After machining operations have been completed at the first and second workstations, the foregoing procedure is repeated such that the first workplace is moved to the third workstation where machining operations are performed by the third turret assembly 20C. Simultaneously, the second workpiece is machined at the second workstation and the third workpiece is machined at the first workstation.

After machining operations have been performed on the first workpiece at the third workstation, the speed of the uppermost counterspindle 106 is synchronized to the speed of the corresponding main spindle 66. The counterspindle 106 is advanced toward the first workpiece and the collet chuck 108 is actuated to grasp the machined end of the first workpiece. Then, the cutoff slide 186 is moved toward the workpiece in order to sever the first workpiece from the remainder of the stock. The counterspindle 106 is retracted and machining operations are performed on the back of the workpiece by tools carried by the turret assembly 20C. After machining operations by the turret assembly 20C have been completed, the workpiece is discharged from the machine 10. As will be apparent from the foregoing description, every time the feed tubes 38 and the carrier 64 are indexed, bar stock is fed through the main spindle 66 located at the first workstation. By using each of the spindles 66, machining operations can be performed simultaneously at each workstation. If desired, workpieces can be passed from the main spindles 66 to the corresponding counterspindles 106 and back again to the main spindles 66. This permits workpieces to be machined first on the back end rather than the front end. Another feature of the invention is that drill bits can be carried by the collet chucks 108. In that case, counter-rotation of the main spindles 66 and the counterspindles 106 results in the effective rotational speed of the drill bit being doubled.

Virtually any type of machining operation can be performed by the machine 10 quickly and accurately due to the use of three separate turret assemblies 20 that can operate simultaneously at three workstations. For example, in the manufacture of a typical coupling, the main spindles 66 were rotated at 2865 RPM. Five separate machining operations were performed at the first workstation with a total cycle time of about 26 seconds. Three separate machining operations were performed at the second workstation with a total cycle time of about 21 seconds. After cutoff at 2865 RPM and transfer to the counterspindle 106, four additional machining operations were performed on the back of the workpiece at various speeds within the range of 1169 RPM to 3966 RPM. Total cycle time at the third workstation was about 28 seconds.

The machine 10 can be used to machine workpieces up to 38 mm in diameter. The standard length of bar stock accommodated by the machine 10 is 3660 mm (12 feet), although lengths within the range of 1830 mm (six feet) to 6100 mm (16 feet) can be handled if suitable feed tubes 38 are installed. Virtually any type of metal can be machined, including steel, stainless steel, brass, and aluminum. For the machine 10 as described, the maximum depth of bore is 150 mm, and the standard maximum turning length is 305 mm. Because the counterspindles 106 are hollow and the rear of the counterspindles is not obstructed, extremely long workpieces can be passed through the machine 10. Such long workpieces can be machined at various places along their length, as well as at their ends.

Although the invention has been disclosed in its preferred embodiment, it will be apparent to those skilled In the art that various changes and modifications can be made without departing from the true spirit and scope of the invention as hereinafter claimed. It is intended that the patent shall cover, by suitable expression in the appended claims, all such changes and modifications.

What is claimed is:

1. A multiple spindle bar machine for machining workpieces from elongate bar stock at a plurality of workstations where the workpieces are rotated about a Z axis and tools are moved relative to the workpieces along an X axis and the Z axis, the machine having a longitudinally extending centerline that lies in the Z axis, comprising:

a base;

a headstock mounted on the base;

a carrier connected to and supported by the headstock;

a plurality of main spindles carried by the carrier, each main spindle including a workpiece-gripping collet, the main spindles being disposed radially about the machine centerline, each main spindle being hollow such that bar stock can be fed therethrough;

means for rotating each main spindle about the Z axis;

means for indexing the carrier about the machine centerline such that each main spindle moves from one workstation to another upon each indexed rotation of the carrier, the number of workstations corresponding to the number of main spindles;

a back wall mounted on the base, the back wall being spaced from the headstock;

a plurality of counterspindles connected to and supported by the back wall and disposed radially about the machine centerline, at least one counterspindle including a workpiece-gripping collet, each counterspindle being disposed in facing relationship to a selected one of the main spindles when the selected main spindle is at a workstation;

means for rotating each of the counterspindles about a Z axis coincident with the axis of rotation of the opposing main spindle;

means for moving each of the counterspindles toward or away from the opposing main spindle along the Z axis;

a plurality of tool-carrying turrets connected to and supported by the base, the turrets being disposed radially about the machine centerline adjacent the workstations, the turrets being positioned at an axial location between the headstock and the back wall; and means for moving a selected turret toward or away from a selected workpiece disposed at a selected workstation to perform machining operations on the workpiece at the workstation.

2. The machine of claim 1, wherein the number of main spindles and the number of counterspindles are equal.

3. The machine of claim 2, wherein three main spindles and three counterspindles are provided.

4. The machine of claim 2, wherein a turret is disposed at each workstation and at least one of the turrets can move along both the X axis and the Z axis.

5. The machine of claim 1, wherein each counterspindle is hollow such that an elongate workpiece can extend therethrough.

6. The machine of claim 1, wherein the means for rotating the main spindles includes:

a circumferentially extending gear included as part of each main spindle;

a drive gear in driving engagement with the gears included as part of each main spindle;

a drive shaft connected to the drive gear; and a motor in driving engagement with the drive shaft.

7. The machine of claim 1, wherein the means for indexing the carrier includes:

a ring gear included as part of the carrier;

a spur gear in engagement with the ring gear; and a motor connected in driving relationship with the spur gear.

8. The machine of claim 1, further comprising a clamp to selectively prevent the carrier from rotating, comprising:

a movable slide connected to the headstock, the slide being in facing relationship to a portion of the carrier;

a locating block carried by the slide;

a plurality of teeth included as part of the carrier, the number of teeth corresponding to the number of main spindles, the teeth being spaced equidistantly about the periphery of the carrier and engageable with the locating block; and an actuator for moving the slide toward and away from the carrier such that the locating block and the teeth can be selectively engaged or disengaged.

9. The machine of claim 1, further comprising:

a toolslide connected to the back wall; and a plurality of housings carried by the toolslide, each housing supporting a counterspindle for rotation and being movable back and forth along the Z axis.

10. The machine of claim 1, further comprising:

a toolslide connected to the back wall, the toolslide having a centerline aligned with the machine centerline and a plurality of lobes equidistantly positioned about the machine centerline;

longitudinally extending rails disposed on each side of each lobe;

carriage blocks disposed on each side of each rail and engageable therewith for sliding movement therealong; and a plurality of housings carried by the toolslide, each housing supporting a counterspindle for rotation, each housing being disposed between adjacent lobes and being connected to the carriage blocks for reciprocating movement along the Z axis.

11. The machine of claim 1, wherein the means for rotating each of the counterspindles includes a motor, a splined ball drive, and a splined drive shaft.

12. The machine of claim 11, wherein the counterspindle drive shaft is hollow.

13. The machine of claim 1, wherein the means for moving each of the counterspindles toward or away from the opposing main spindle includes a motor and a ball screw actuator.

14. The machine of claim 1, wherein the means for moving a selected turret toward or away from a selected workpiece includes a motor and a ball screw actuator for moving each turret along the X axis, and a motor and a ball screw actuator for moving each turret along the Z axis for those turrets capable of moving along the Z axis.

15. The machine of claim 1, further comprising a slide-mounted cutoff disposed adjacent a selected one of the workstations for movement along the X axis, the cutoff including a motor and a ball screw actuator for moving the cutoff along the X axis.

16. A multiple spindle bar machine for machining workpieces from elongate bar stock at one of three workstations where the workpieces are rotated about a Z axis and tools are moved relative to the workpieces along an X axis and the Z axis, the machine having a longitudinally extending centerline that lies in a Z axis, comprising:

a base;

a headstock mounted on the base;

a carrier connected to and supported by the headstock;

three main spindles carried by the carrier, each main spindle including a workpiece-gripping collet, the main spindles being disposed equidistantly about the machine centerline, each main spindle being hollow such that bar stock can be fed therethrough;

means for rotating each main spindle about the Z axis, the means for rotating including a circumferentially extending gear included as part of each main spindle, a drive gear in driving engagement with the gears included as part of each main spindle, a drive shaft connected to the drive gear, and a motor in driving engagement with the drive shaft;

means for indexing the carrier about the machine centerline such that each main spindle moves from one workstation to another upon each indexed rotation of the carrier, the means for indexing including a ring gear included as part of the carrier, a spur gear in engagement with the ring gear, and a motor connected in driving relationship with the spur gear;

a clamp to selectively prevent the carrier from rotating, the clamp including a movable slide connected to the headstock, the slide being in facing relationship to a portion of the carrier, a locating block carried by the slide, a plurality of teeth included as part of the carrier, the number of teeth corresponding to the number of main spindles, the teeth being spaced equidistantly about the periphery of the carrier and engageable with the locating block, and an actuator for moving the slide toward and away from the carrier such that the locating block and the teeth can be selectively engaged or disengaged;

a back wall mounted on the base, the back wall being spaced from the headstock;

three counterspindles disposed equidistantly about the machine centerline, at least one counterspindle including a workpiece-gripping collet, each counterspindle being disposed in facing relationship to a selected one of the main spindles when the selected main spindle is at a workstation, each counterspindle being hollow such that an elongate workpiece can extend therethrough;

a toolslide connected to the back wall, the toolslide having a centerline aligned with the machine centerline and a plurality of lobes equidistantly positioned about the machine centerline, longitudinally extending rails disposed on each side of each lobe, and carriage blocks disposed on each side of each rail and engageable therewith for sliding movement therealong;

a plurality of housings carried by the toolslide, each housing supporting a counterspindle for rotation, each housing being disposed between adjacent lobes and being connected to the carriage blocks for reciprocating movement along the Z axis;

a motor, a splined ball drive, and a hollow drive shaft for rotating each of the counterspindles about a Z axis coincident with the axis of rotation of the opposing main spindle;

a motor and a ball screw actuator for moving each of the counterspindles toward or away from the opposing main spindle along the Z axis;

three tool-carrying turrets connected to and supported by the base, the turrets being disposed radially about the machine centerline adjacent the workstations, the turrets being positioned at an axial location between the headstock and the back wall, all of the turrets capable of being moved along an X axis and at least one of the turrets capable of being moved along both the X axis and the Z axis;

a motor and a ball screw actuator for moving each turret along the X axis;

a motor and a ball screw actuator for moving each turret along the Z axis for those turrets capable of moving along the Z axis;

a slide-mounted cutoff disposed adjacent a selected one of the workstations, the cutoff capable of being moved along the X axis; and a motor and a ball screw actuator for moving the cutoff along the X axis.

17. A method for machining workpieces from elongate bar stock at multiple workstations of a multiple spindle bar machine, the machine having a longitudinally extending centerline that lies in a Z axis, comprising the steps of:

providing a plurality of hollow main spindles disposed about the centerline, each main spindle being rotatable about a Z axis;

providing a plurality of counterspindles disposed about the reference axis, each counterspindle being rotatable about a Z axis, each counterspindle being opposed to a main spindle and having its axis of rotation coincident with the axis of rotation of the main spindle;

feeding an elongate workpiece through a selected main spindle;

performing machining operations on the front end of the workpiece at a first workstation;

indexing the selected main spindle to another workstation;

performing machining operations on the front end of the workpiece at the other workstation;

moving the counterspindle located as the other workstation toward the workpiece;

synchronizing rotation of the main spindle and counterspindle;

grasping the workpiece with the counterspindle;

severing the workpiece from the main spindle;

moving the workpiece away from the main spindle;

performing machining operations on the back end of the workpiece at the other workstation; and releasing the workpiece from the counterspindle.

18. The method of claim 17, wherein three main spindles, three counterspindles, and three workstations are provided, and the steps of severing the workpiece and performing machining operations on the back end of the workpiece occur at the third workstation.

19. The method of claim 17, comprising the further steps of:

indexing a second main spindle to the first workstation immediately after the selected main spindle has been indexed to another workstation;

feeding an elongate workpiece into the second main spindle at the first workstation; and performing machining operations on the front end of the workpiece located at the first workstation while machining operations are being performed on the workpiece located at the other workstation.

* * * * *